(12) United States Patent
Vajravel et al.

(10) Patent No.: US 11,809,879 B2
(45) Date of Patent: Nov. 7, 2023

(54) DYNAMICALLY SELECTING A CONTAINER MODE

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 536 days.

(21) Appl. No.: 17/164,218

(22) Filed: Feb. 1, 2021

(65) Prior Publication Data

US 2022/0244970 A1 Aug. 4, 2022

(51) Int. Cl.
*G06F 9/44* (2018.01)
*G06F 9/445* (2018.01)
*G06F 9/50* (2006.01)
*G06N 20/00* (2019.01)
*H04L 67/60* (2022.01)

(52) U.S. Cl.
CPC .......... *G06F 9/44505* (2013.01); *G06F 9/505* (2013.01); *G06N 20/00* (2019.01); *H04L 67/60* (2022.05)

(58) Field of Classification Search
CPC .................................................. G06F 9/44505
USPC .......................................................... 718/104
See application file for complete search history.

(56) References Cited

U.S. PATENT DOCUMENTS

| | | | | |
|---|---|---|---|---|
| 9,888,067 | B1* | 2/2018 | Yemini | H04L 67/1008 |
| 2016/0098285 | A1* | 4/2016 | Davis | G06F 9/45545 |
| | | | | 718/1 |
| 2020/0120142 | A1* | 4/2020 | Maynard | G06Q 10/067 |

* cited by examiner

*Primary Examiner* — Timothy A Mudrick
(74) *Attorney, Agent, or Firm* — KIRTON MCCONKIE; Brian Tucker

(57) ABSTRACT

A container mode can be dynamically selected when an application is launched on an end user computing device. When an application is deployed to the end user computing device, a container configurator can collect information about the application and share it with a machine learning solution to receive an application score for the application. When the application is launched on the end user computing device, the container configurator can provide the application score, capabilities of the end user computing device, current resource utilization and admin preferences to the machine learning solution. The machine learning solution can then dynamically select a container mode based on this information and provide the selection to the container configurator. The container configurator can then cause the application to be launched within a container that matches the selected container mode.

20 Claims, 11 Drawing Sheets

ML Solution 250

| Capabilities and Resource Utilization | Admin Preferences | App Score | Recommended Container Mode |
|---|---|---|---|
| Trusted = Yes (e.g., work laptop)<br>VMM Capable = Yes<br>SGX Capable = Yes<br>Available RAM = 10GB<br>Available Storage = 90GB<br>... | Security | Trust Rank = Medium<br>Peripherals = Null<br>Runtime Size = Low | Dedicated VM container per app<br>(e.g. Qubes OS) |
| | Performance | Trust Rank = High<br>Peripherals = Null<br>Runtime Size = Low | Software virtualization container<br>(e.g. Docker, FreeBSD Jails) |
| Trusted = No (e.g., home laptop)<br>VMM Capable = Yes<br>SGX Capable = Yes<br>Available RAM = 6GB<br>Available Storage = 5GB<br>... | Security | Trust Rank = Low<br>Peripherals = Mic, Webcam<br>Runtime Size = High | Shared hardware container for multiple apps with enclave isolation<br>(e.g., Graphene) |
| ... | | | |

FIG. 5

DYNAMICALLY SELECTING A CONTAINER MODE

CROSS-REFERENCE TO RELATED APPLICATIONS

N/A

BACKGROUND

Containerization in the software context refers to a technique for packaging an application and its dependencies into a container to abstract/isolate the application from the underlying host operating system and environment. A number of containerization techniques exist. FIG. 1 represents a computing device 100 that has physical hardware 101, a hypervisor 102 and a host operating system 120. Application 121 is an example of an application that is not containerized in that it relies on binaries/libraries 120 to interface directly with host operating system 110. In contrast, application 122 represents an application that is executed in a first type of container in which containerization is implemented using access control mechanisms 123. Examples of solutions that implement containerization through access control mechanisms 123 include Security-Enhanced Linux (SELinux) and AppArmor.

Applications 123 and 124 represent examples of applications that are executed in a second type of container in which containerization is implemented using software virtualization. Examples of solutions that implement containerization through software virtualization include Docker and FreeBSD Jails. As represented in FIG. 1, each application 123 and 124 and its binaries/libraries 131a and 131b may be isolated within its own container 132 that is executed via a docker engine 130 that runs on host operating system 110. Variations of this second type of container include Intel Software Guard Extensions (SGX) and Arm TrustZone which containerize an application within a secure region of memory.

Applications 125 and 126 represent examples of applications that are executed in a third type of container in which containerization is implemented using hardware virtualization. Examples of solutions that implement containerization through hardware virtualization include Intel Clear Containers, Hyper-V Docker and Qubes OS. As represented in FIG. 1, with this third type of container, a uni/mini kernel 140 is executed on hypervisor 102. A docker engine 141 can then be run on uni/mini kernel 140 to containerize applications 125 and 126 and their respective binaries/libraries 142a and 142b.

Although not represented in FIG. 1, it is even possible to combine multiple types of containerization solutions. For example, Docker may be used with SELinux to execute an application. As another example, Graphene combines software enclaves (e.g., Intel SGX) with hardware virtualization (e.g., via a unikernel). Accordingly, there is a wide variety of "container modes" for executing an application.

It is becoming more common for an enterprise to use containerization solutions to run applications on computing devices that its employees may use. A primary benefit of employing containerization solutions is that it enables the applications to be deployed and launched from a cloud-based management server or other centralized repository as opposed to being installed on the computing devices in a traditional manner. As a result, the employees can launch the applications on a variety of computing devices. However, this flexibility in deploying applications creates significant management overhead. For example, due to variations in hardware and security capabilities, not all containerization solutions will be available to launch an application on a particular computing device. Also, it is typically the case that a less secure containerization solution is also the most widely available and has the best performance. Therefore, administrators often sacrifice security in selecting the more widely available and/or better performing containerization solution.

One common use case that an enterprise may face is when the employee uses a native business application (e.g., SalesForce) at work on his or her work computer and also wants to use the native business application on his or her home computer. In such a use case, the first type of containerization may not be available to host the native business application on the home computer because the home computer is not trusted. The third type of containerization also may not be available because the administrator will not know if the home computer has the appropriate security capabilities (e.g., the Intel VT-x capability).

Another common use case that an enterprise may face is when the employee wants to use untrusted third party applications on his or her work computer without integrity checks. In such cases, the untrusted application could violate the container's privileges or restrictions and cause the container to fail.

To maximize security, the third type of containerization solutions could preferably be employed. However, such containers consume much more physical resources than other types of containers and can quickly exhaust such resources. As a result, the number of applications that can be run simultaneously within the third type of container is far more limited.

In short, it is very difficult for an administrator to determine an appropriate container mode for any given application on any given employee's computer. As a result, administrators typically settle on an approach that sacrifices performance or security.

BRIEF SUMMARY

The present invention extends to systems, methods and computer program products for dynamically selecting a container mode. A container configurator can be employed on an end user computing device to manage the dynamic selection of a container mode for a particular application. When an application is deployed to the end user computing device, the container configurator can collect information about the application and share it with a machine learning solution to receive an application score for the application. When the application is launched on the end user computing device, the container configurator can submit a container selection mode request to the machine learning solution by providing the application score, capabilities of the end user computing device, current resource utilization and admin preferences. The machine learning solution can then dynamically select a container mode based on this information and provide the selection to the container configurator. The container configurator can then cause the application to be launched using the selected container mode.

In some embodiments, the present invention is implemented as a method for dynamically selecting a container mode when launching an application on an end user computing device. It can be detected that a first application is being launched on an end user computing device. A container mode selection request can then be sent to a server. The container mode selection request includes an application score for the first application. A selected container mode can be received from the server in response to the container mode selection request. A container that matches the selected container mode can be prepared on the end user computing device. The first application can then be launched in the container.

In some embodiments, the present invention is implemented as computer storage media storing computer executable instructions which when executed implement a method for dynamically selecting a container mode when launching an application on an end user computing device. It can be detected that a first application is being launched on an end user computing device. A first container mode selection request can be sent to a server. The first container mode selection request includes a first application score for the first application. A first selected container mode can be received from the server in response to the first container mode selection request. A first container that matches the first selected container mode can be prepared on the end user computing device. The first application can then be launched in the first container. It can also be detected that a second application is being launched on the end user computing device. A second container mode selection request can be sent to the server. The second container mode selection request includes a second application score for the second application. A second selected container mode can be received from the server in response to the second container mode selection request. A second container that matches the second selected container mode can be prepared on the end user computing device. The second application can then be launched in the second container.

In some embodiments, the present invention can be implemented as a method for dynamically selecting a container mode when launching an application on an end user computing device. A container configurator executing on an end user computing device can detect that an application has been deployed to the end user computing device. The container configurator can send application information for the application to a machine learning solution. The machine learning solution can generate an application score from the application information. The container configurator can receive the application score. The container configurator can detect that the application is being launched on the end user computing device. The container configurator can send a container mode selection request to the machine learning solution. The container mode selection request includes the application score. The machine learning solution can generate a selected container mode for launching the application based on the application score and one or more of capabilities of the end user computing device, resource utilization on the end user computing device or admin preferences. The container configurator can receive the selected container mode. The container configurator can prepare a container on the end user computing device that matches the selected container mode. The container configurator can then cause the application to be launched in the container.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 5 provides examples of how a machine learning solution may dynamically select a container mode.

DETAILED DESCRIPTION

In this specification and the claims, the term "end user computing device" should be construed as any computing device that an end user may employ to launch an application and that is capable of executing the application within a container. Examples of end user computing devices include a desktop, laptop, thin client or tablet that an employer provides to an employee for use at work (which would typically be a trusted computing device), the employee's personal desktop, laptop, thin client, tablet, etc. (which would typically be an untrusted computing device) and any other end user computing device the employee may attempt to use to run an application for work purposes.

The term "container mode" should be construed as a particular type of container in which an application can be run. Various container modes are described in the background, but embodiments of the present invention should not be limited only to the described container modes. A container mode should also be construed as encompassing the use of a single containerization solution or the use of multiple containerization solutions for running a single application. The selection of a container mode entails selecting in which type of container an application will be launched on an end user computing device.

Figure 1:
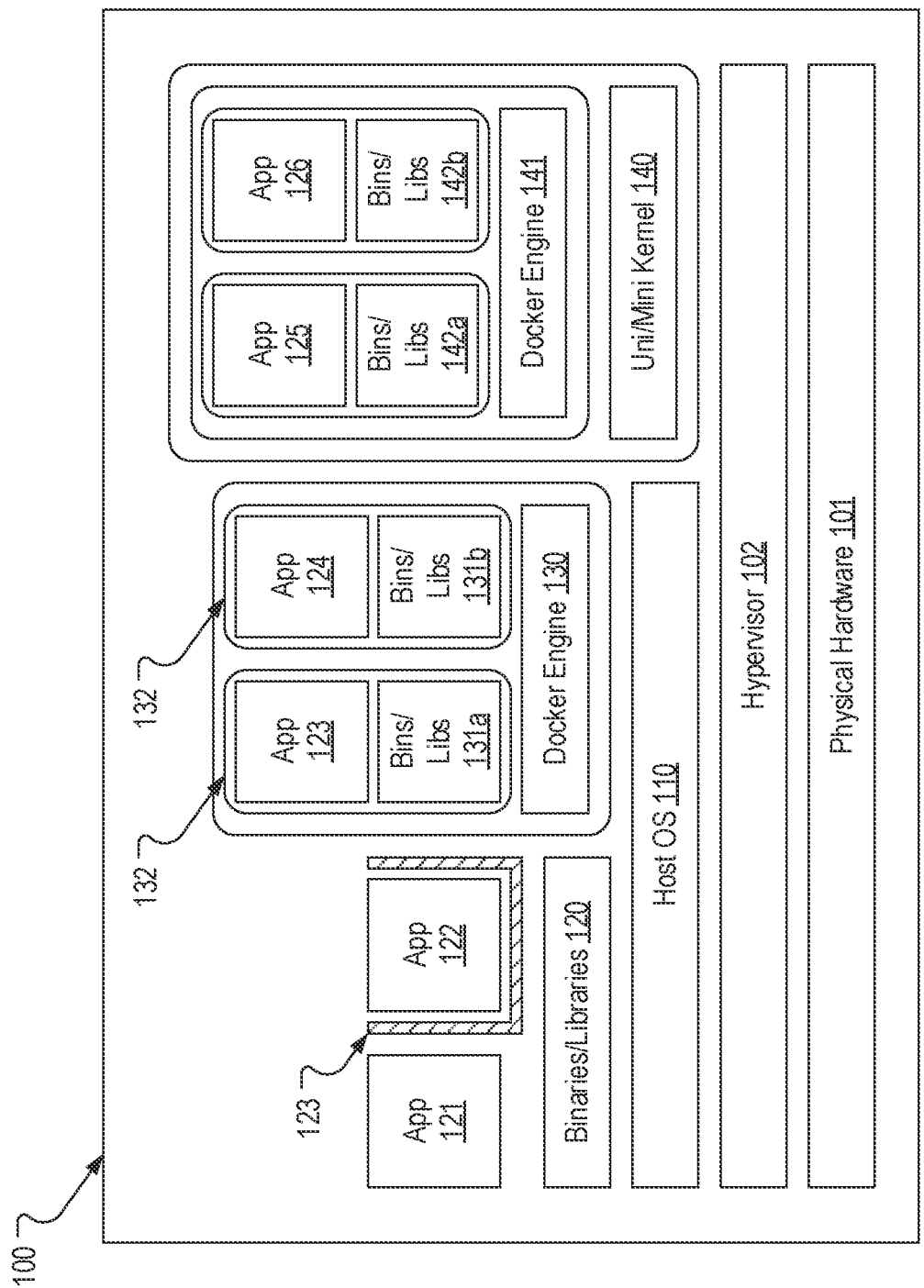
FIG. 1 provides examples of various types of containers that can be used to execute an application on a computing device.
Figure 2:
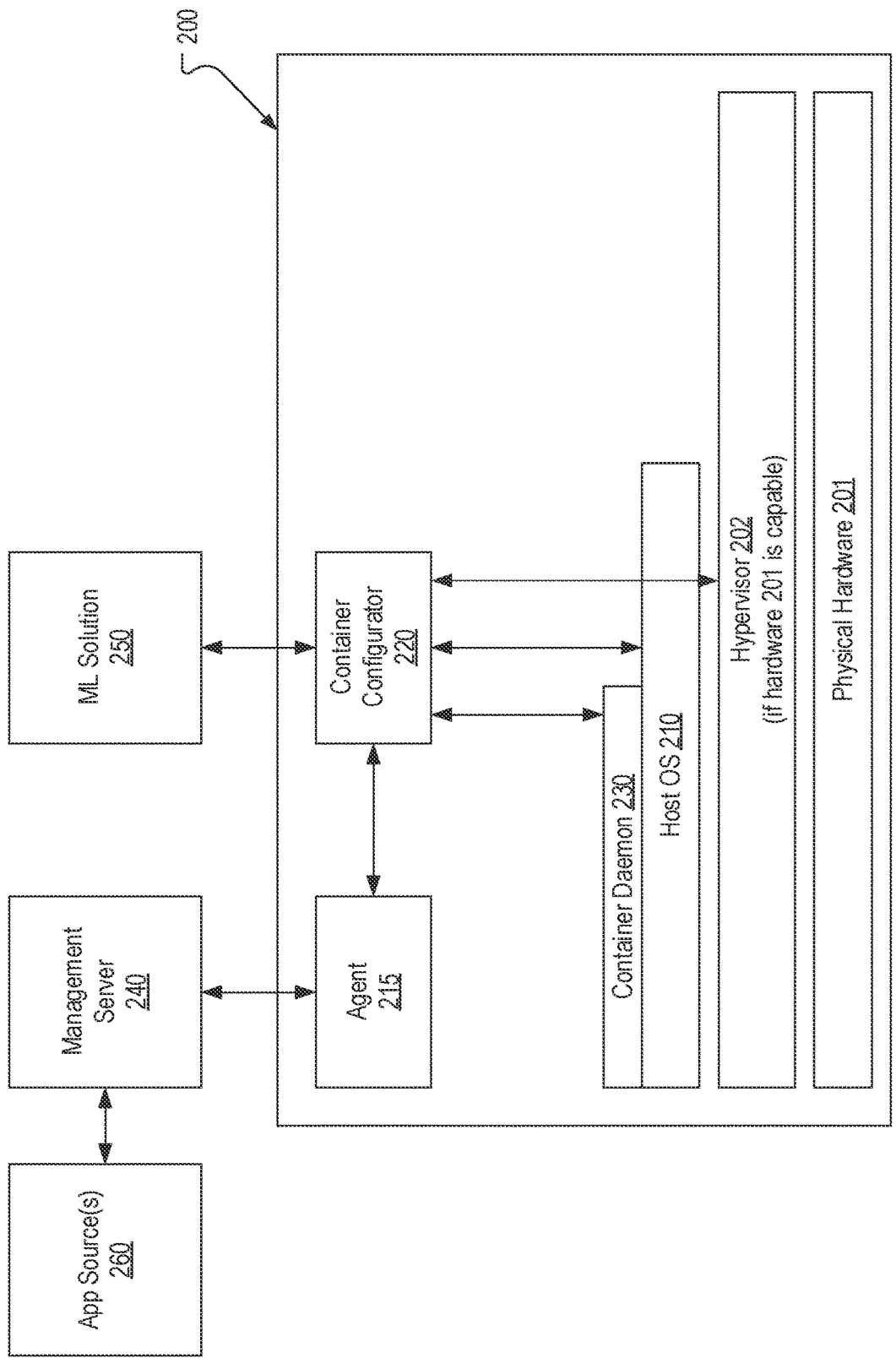
FIG. 2 represents various components that can be employed to dynamically select a container mode when an application is to be launched on an end user computing device.

FIG. 2 illustrates various components that can be included on an end user computing device 200 to enable embodiments of the present invention to be implemented. As with computing device 100, end user computing device 200 includes physical hardware 201, a hypervisor 202 (if supported by physical hardware 201) and a host OS 210. Additionally, an agent 215 and a container configurator 220 may be installed on end user computing device 200 to perform the functionality described herein. In some embodiments, container configurator 220 may employ a container daemon 230 to perform some of the functionality for interfacing with host OS 210 and/or hypervisor 202 (e.g., to interface at the kernel level). To simplify the description, container configurator 220 will be described as performing such functionality directly with host OS 210. However, it is to be understood that container configurator 220 may equally employ container daemon 230 in some embodiments. In short, the exact manner in which container configurator 220 accomplishes such functionality is not essential to the present invention.

FIG. 2 also shows a management server 240 with which agent 215 may interface for the purpose of receiving applications and admin configurations, preferences, policies, etc. ("admin preferences"). Management server 240 may receive applications from one or more application sources 260 such as a trusted application repository (e.g., a private Docker registry) or third party distribution channels. FIG. 2 further shows a machine learning (ML) solution 250 with which container configurator 220 may interface to dynamically select a container mode when an application is launched on end user computing device 200.

Figure 3A:
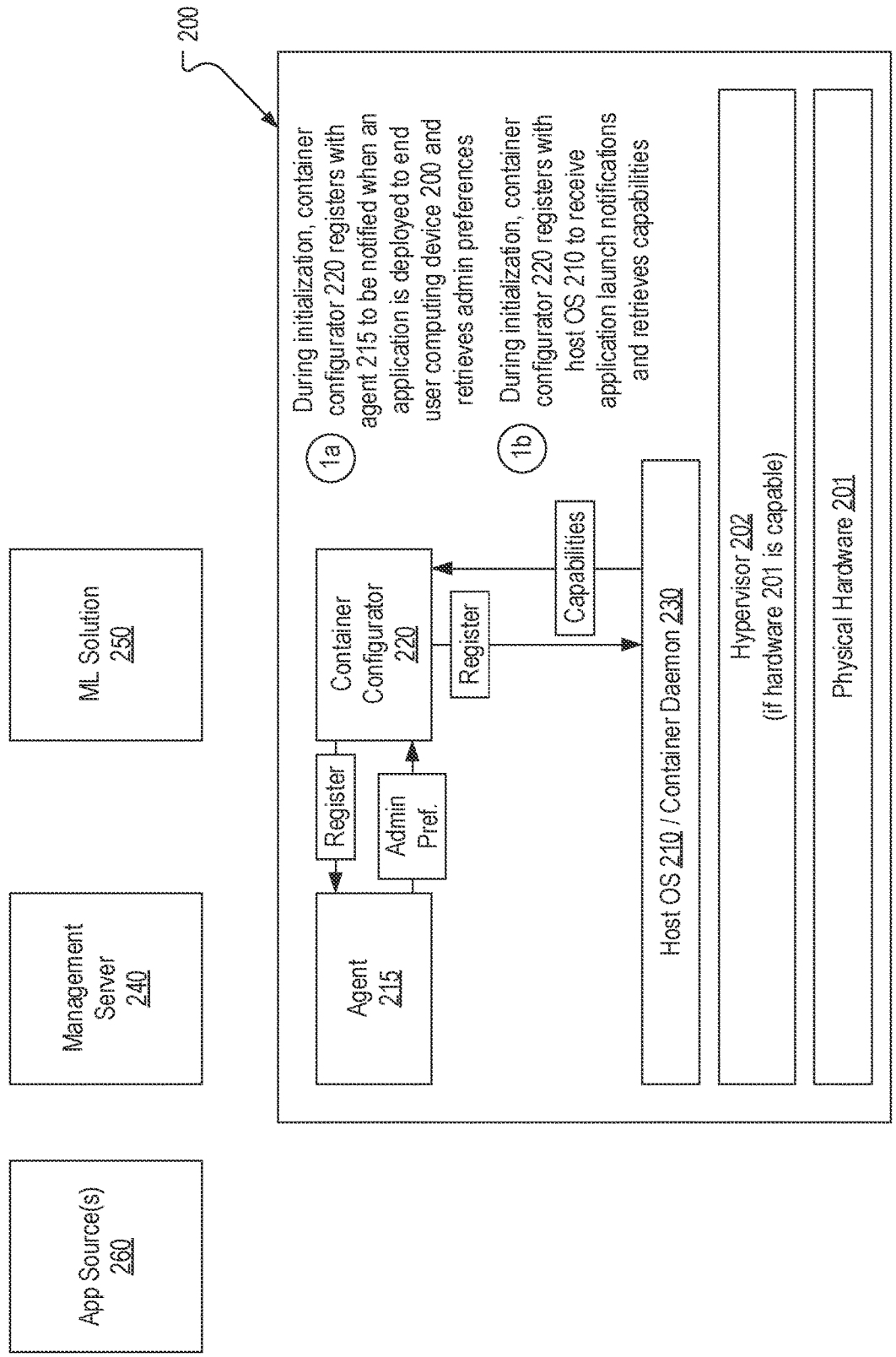
FIGS. 3A-3F provide an example of how a container mode can be dynamically selected in accordance with one or more embodiments of the present invention.

FIGS. 3A-3F illustrate an example sequence of steps that can be performed in the environment represented in FIG. 2 to enable a container mode to be dynamically selected when an application 300 is launched on end user computing device 200. FIG. 3A represents functionality that container configurator 220 may perform in some embodiments as part of its initialization on end user computing device 200. In step 1a, container configurator 220 can register with agent 215 to be notified when an application is deployed to end user computing device 200. As a result of this step, agent 215 can notify container configurator 220 whenever management server 240 pushes an application to end user computing device 200 or otherwise makes the application available to end user computing device 200. In step 1a, container configurator 220 may also retrieve any admin preferences from or via agent 215. For example, an admin may employ management server 240 to push admin preferences to container configurator 220 via agent 215 which define whether security or performance (scalability) is preferred when selecting a container mode.

In step 1b, container configurator 220 can also register with host OS 210 to receive application launch notifications and to retrieve/identify capabilities of end user computing device 200. As examples only, such capabilities could include whether physical hardware 201 supports hypervisor 202, whether VT-x is enabled, whether Intel SGX is supported, etc. By registering to be notified when an application is to be launched, container configurator 220 can prevent the launch from proceeding until after a container mode has been dynamically selected for the application.

Figure 3B:
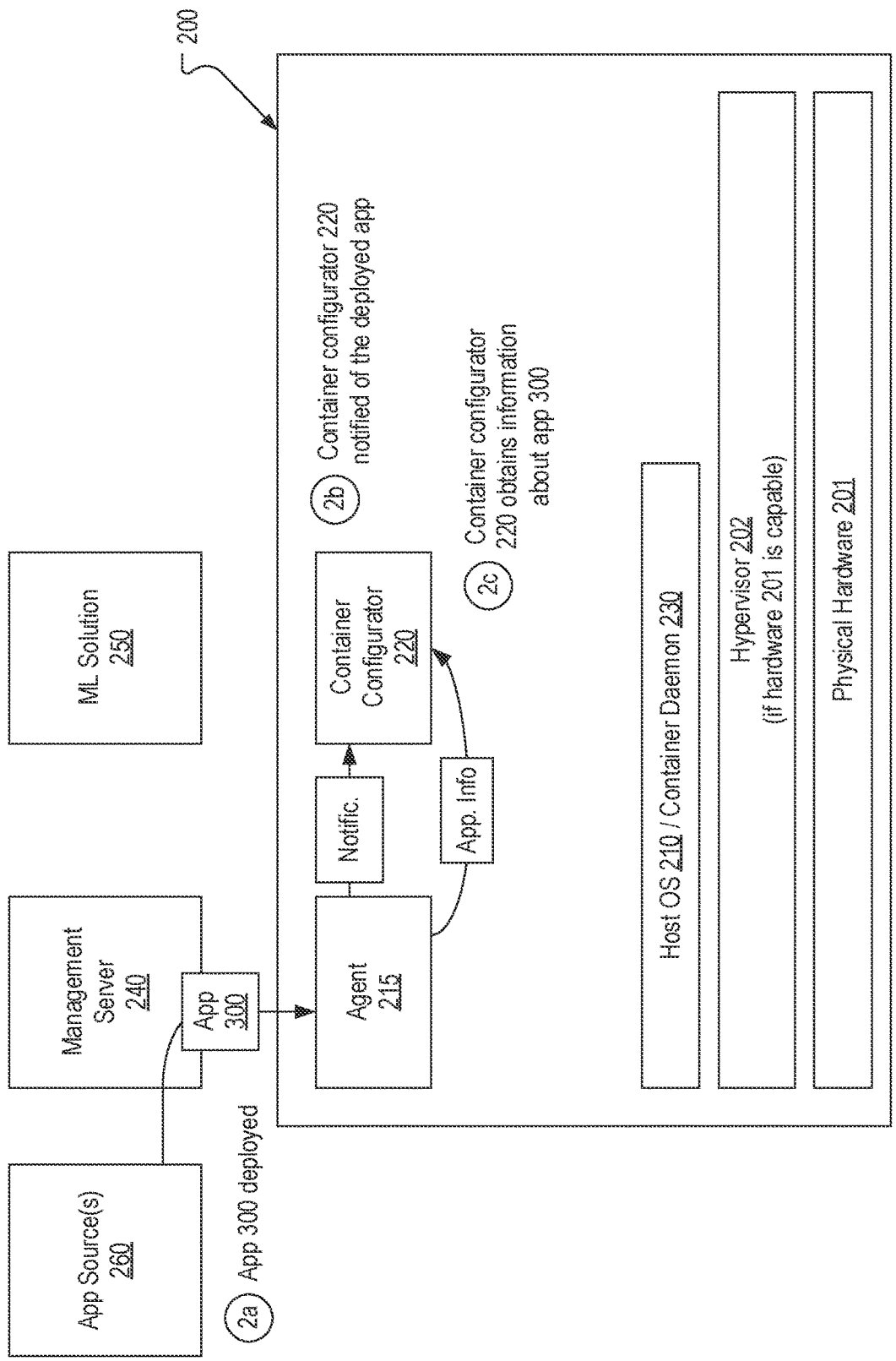

Turning to FIG. 3B, it is assumed that, in step 2a, management server 240 deploys an application 300 to agent 215 so that application 300 will be available to be launched on end user computing device 200. In step 2b, container configurator 220 can receive a notification of the deployment of application 300. In response, in step 2c, container configurator 220 can obtain information about application 300. This "application information" can include any information that may be employed by ML solution 250 to generate an "application score" for the application for purposes of dynamically selecting a container mode. As examples only, the application information may include the name of the application, whether it is signed, whether its certificate is trusted, its image size, its dependencies (e.g., the binaries and libraries it relies on), peripherals it relies on, etc.

Figure 3C:
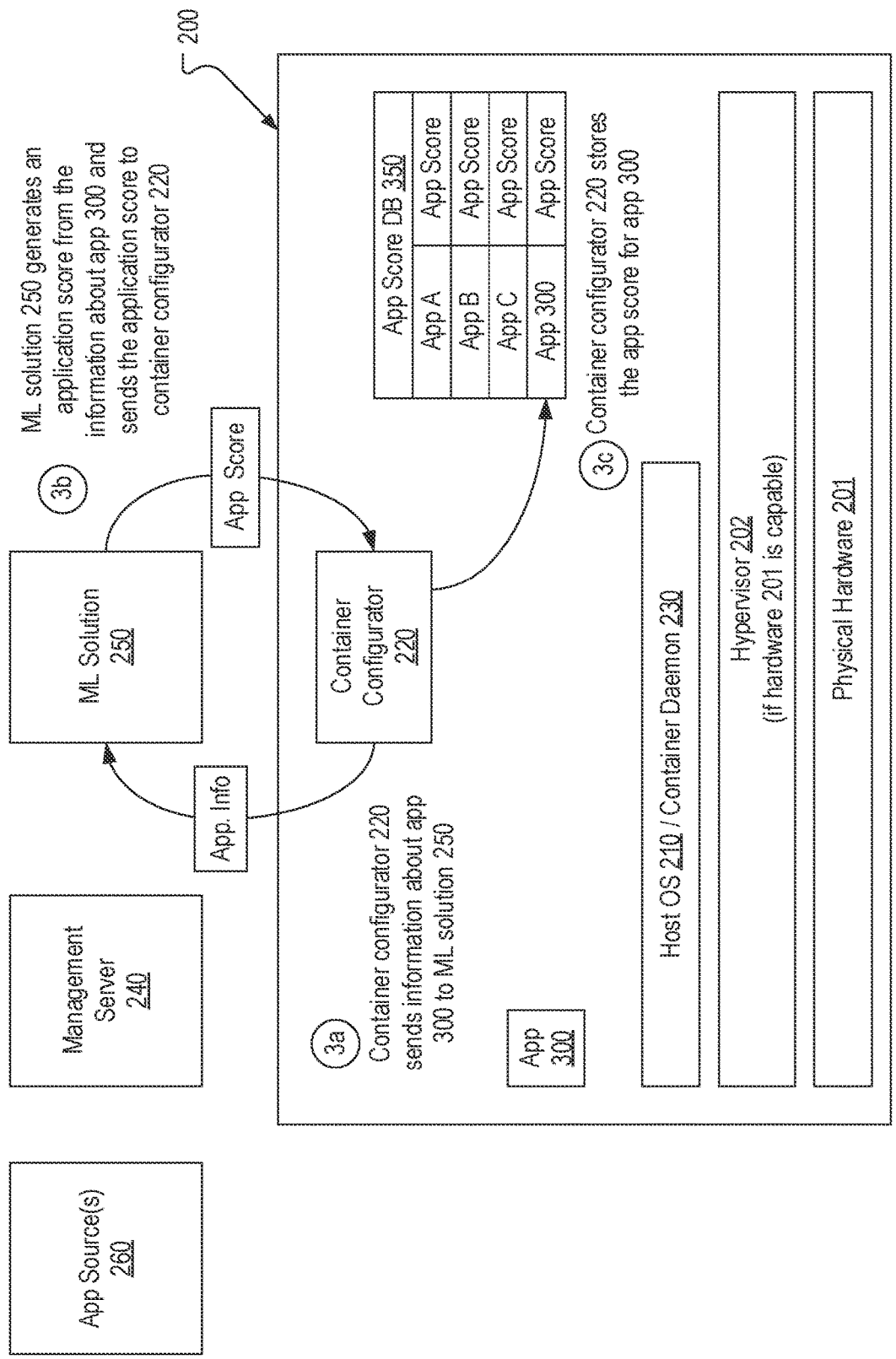

Turning to FIG. 3C, in step 3a, container configurator 220 can send the application information for application 300 to ML solution 250 as part of a request to obtain an application score for application 300. ML solution 250 can employ its machine learning algorithm(s) to process the application information to generate an application score which it then sends to container configurator 220 in step 3b. In step 3c, container configurator 220 can store the application score in an application score database 350. Accordingly, container configurator 220 may maintain application scores for any application that has been deployed to end user computing device 200. In some embodiments, container configurator 220 may be configured to periodically update a deployed application's application score (e.g., by repeating steps 3a-3c), may update the application score in response to the application being launched or may update the application score at any other time or in response to any other occurrence.

Figure 4:
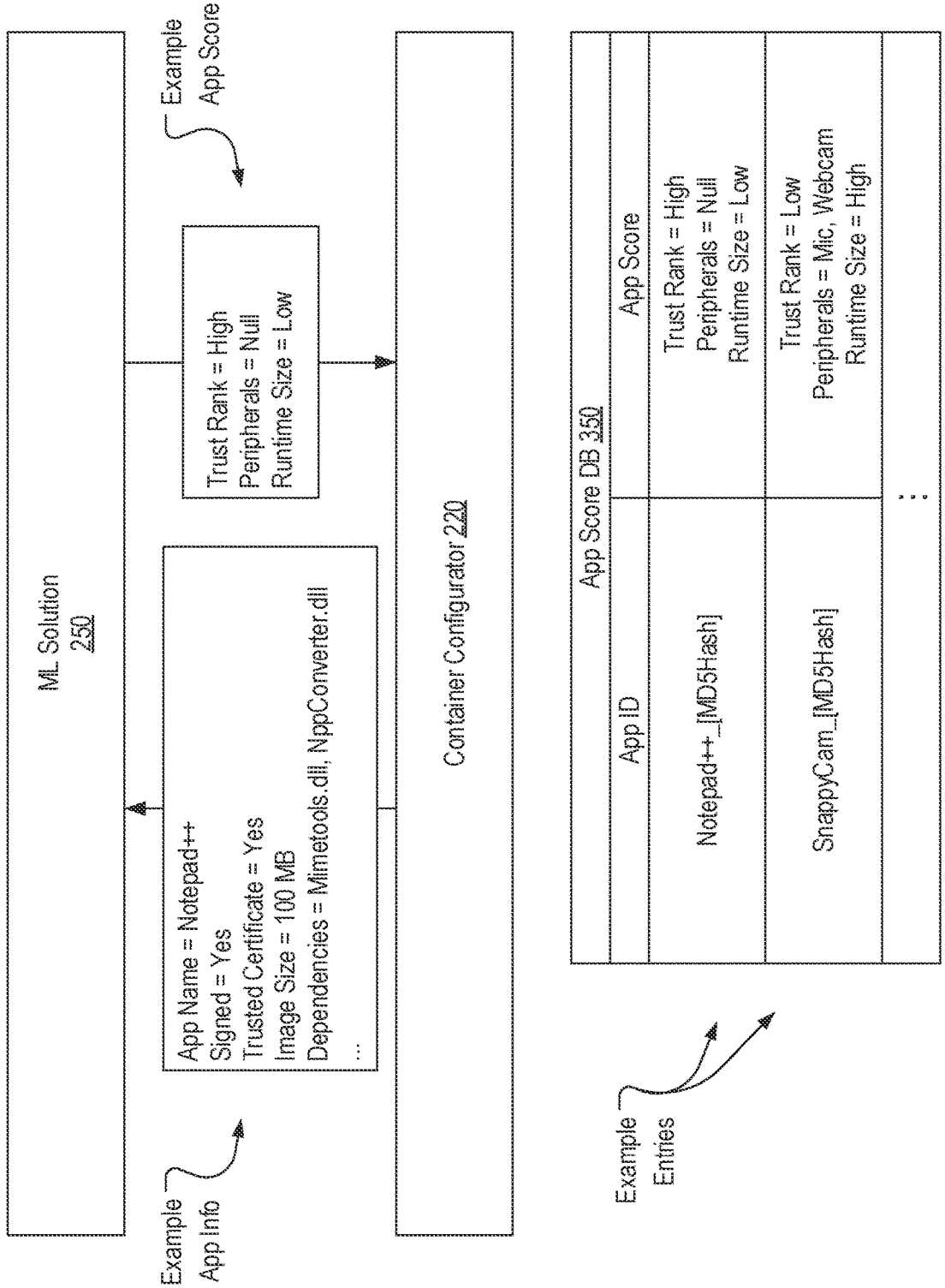
FIG. 4 provides examples of application information that a container configurator can provide to a machine learning solution and an application score generated from the application information and provides an example of how this application score can be stored.

FIG. 4 provides examples of how the application information and a resulting application score for a particular application may be configured in some embodiments of the present invention. In this example, the application is assumed to be Notepad++ which is signed, has a trusted certificate, has an image size of 100 MB and is dependent on multiple DLLs, among possibly other information. The example application score that ML solution 250 may generate from this example application information may include a trust rank of high (which could be selected from possible values of low, medium and high), an identification of peripherals that the application uses (which is none in this example) and an anticipated size of the application's runtime environment as low (which could be selected from possible values of low, medium and high). Accordingly, the application score can include security-related components and performance-related components.

FIG. 4 also provides an example of how container configurator 220 may maintain application scores within application score database 350. As shown, application score database 350 may include a unique application ID for each application for which an application score has been obtained. This application ID could be a combination of the application's name and the hash of its image. This application ID can be associated with the application score that container configurator 220 most recently received from ML solution 250 for the respective application. Accordingly, when an application is launched, container configurator 220 can identify the correct application score by combining the name of the launched application with the hash of its image to create the application ID and then retrieving the application score associated with that application ID in application score database 350.

Figure 3D:
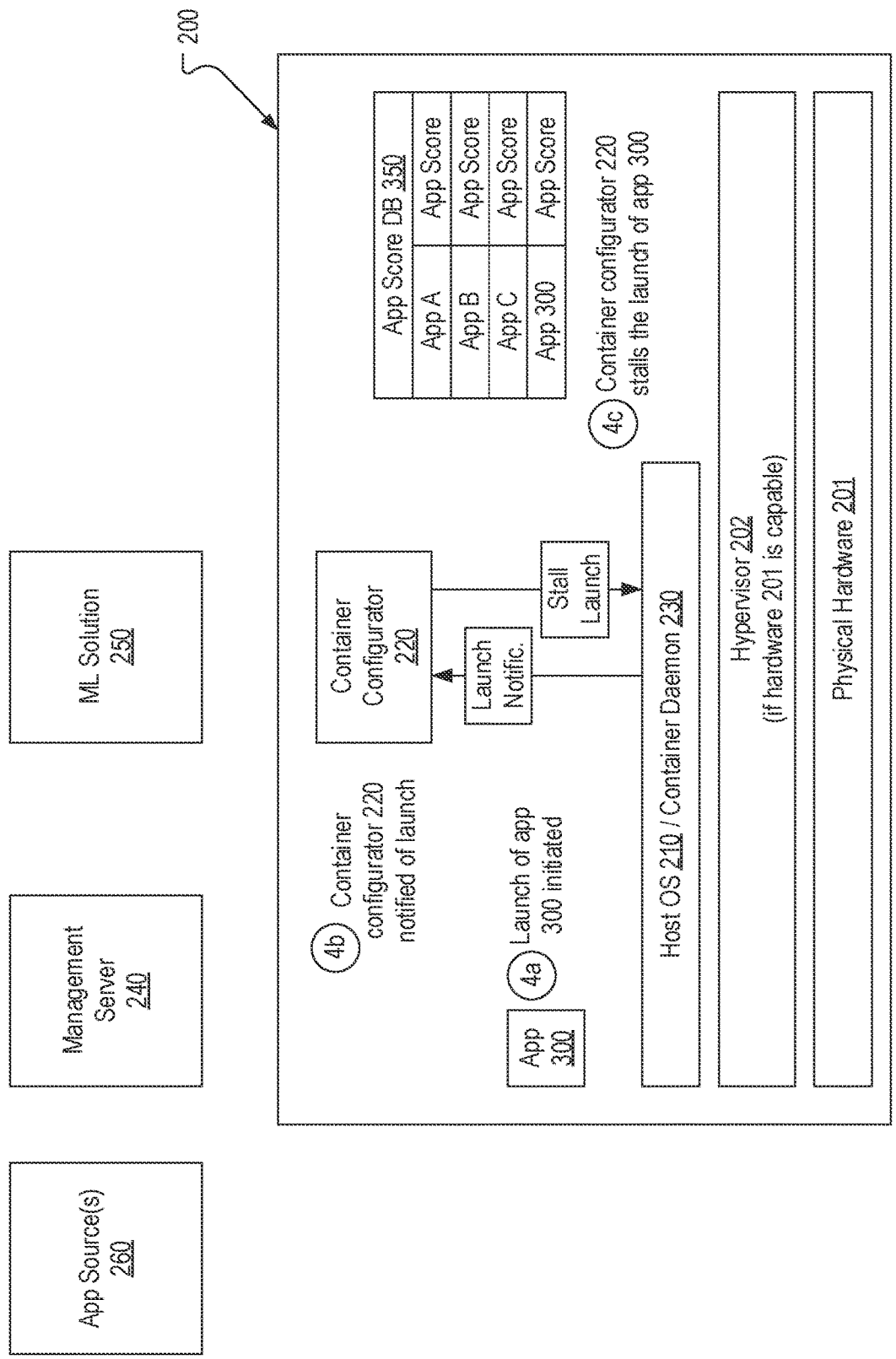

Turning to FIG. 3D, it is now assumed that, in step 4a, application 300 is launched on end user computing device 200. In step 4b, container configurator 220 can detect that application 300 is being launched, and in step 4c, can stall the launch. Then, in step 5a shown in FIG. 3E, container configurator 220 can gather a variety of information for submitting a container mode selection request to ML solution 250. This information can include the application score for application 300 which is retrieved from application score database 350 (or generated on demand by performing steps 3a-3c), current resource utilization on end user computing device 200 (which could have been recently obtained and stored or obtained on demand), capabilities of end user computing device 200 (which could be obtained on demand from host OS 210 or previously stored by container configurator 220) and any admin preferences (which could also be obtained on demand from agent 215 or previously stored by container configurator 220), among possibly other information. Notably, this information need not be sent as part of the same request or even at the same time. For example, the capabilities and the admin preferences could be sent previously (see, e.g., FIG. 6) and maintained on ML solution 250.

In step 5b, container configurator 220 can submit the container mode selection request to ML solution 250. In turn, ML solution 250 can apply its machine learning algorithms to the information in the container mode selection request to dynamically select a container mode that is best suited for launching application 300 at that moment on end user computing device 200. ML solution 250 can provide this selected container mode back to container configurator 220.

FIG. 5 provides examples of how ML solution 250 may select a particular container mode based on various combinations of information that may be provided in a container mode selection request. In a first example, it is assumed that the end user computing device is trusted, is VMM and SGX capable and has 10 GB of RAM and 90 GB of storage available. It is also assumed that the admin prefers security and that the application score of the application being launched defines a trust rank of medium, no peripherals and a runtime size of low. Based on this information, ML solution 250 may select as the container mode a dedicated VM container that the application does not share with any other application. In a second example in which the capabilities and resource utilization is the same but the admin prefers performance and the application score defines a trust rank of high, no peripherals and a runtime size of low, ML solution 250 may select as the container mode a software virtualization container. In a third example in which the end user computing device is not trusted, is VMM and SGX capable and has 6 GB of RAM and 5 GB of storage available, the admin prefers security and the application score defines a trust rank of low, mic and webcam as the peripherals and a runtime size of high, ML solution 250 may select as the container mode a hardware container that multiple applications share with each application being isolated within its own enclave.

As can be seen, there is a wide variety of criteria that ML solution 250 may employ to dynamically select a particular container mode. ML solution 250 can refine its algorithm over time based on feedback it may receive from instances of container configurator 220 executing on a number of end user computing devices to ensure that its algorithm selects a container mode that best complies with the admin preferences while maintaining adequate security and performance safeguards.

Figure 3E:
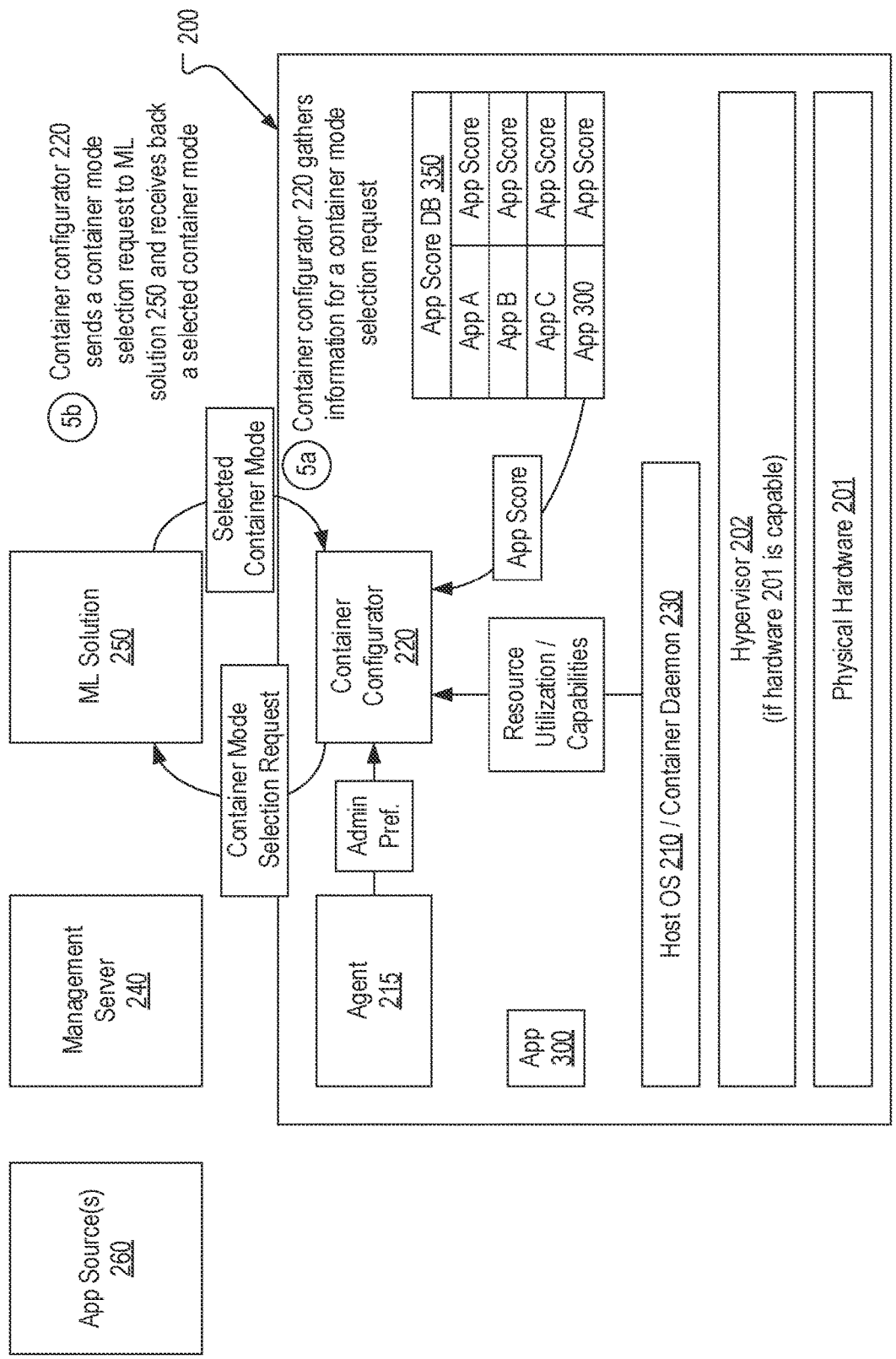
Figure 3F:
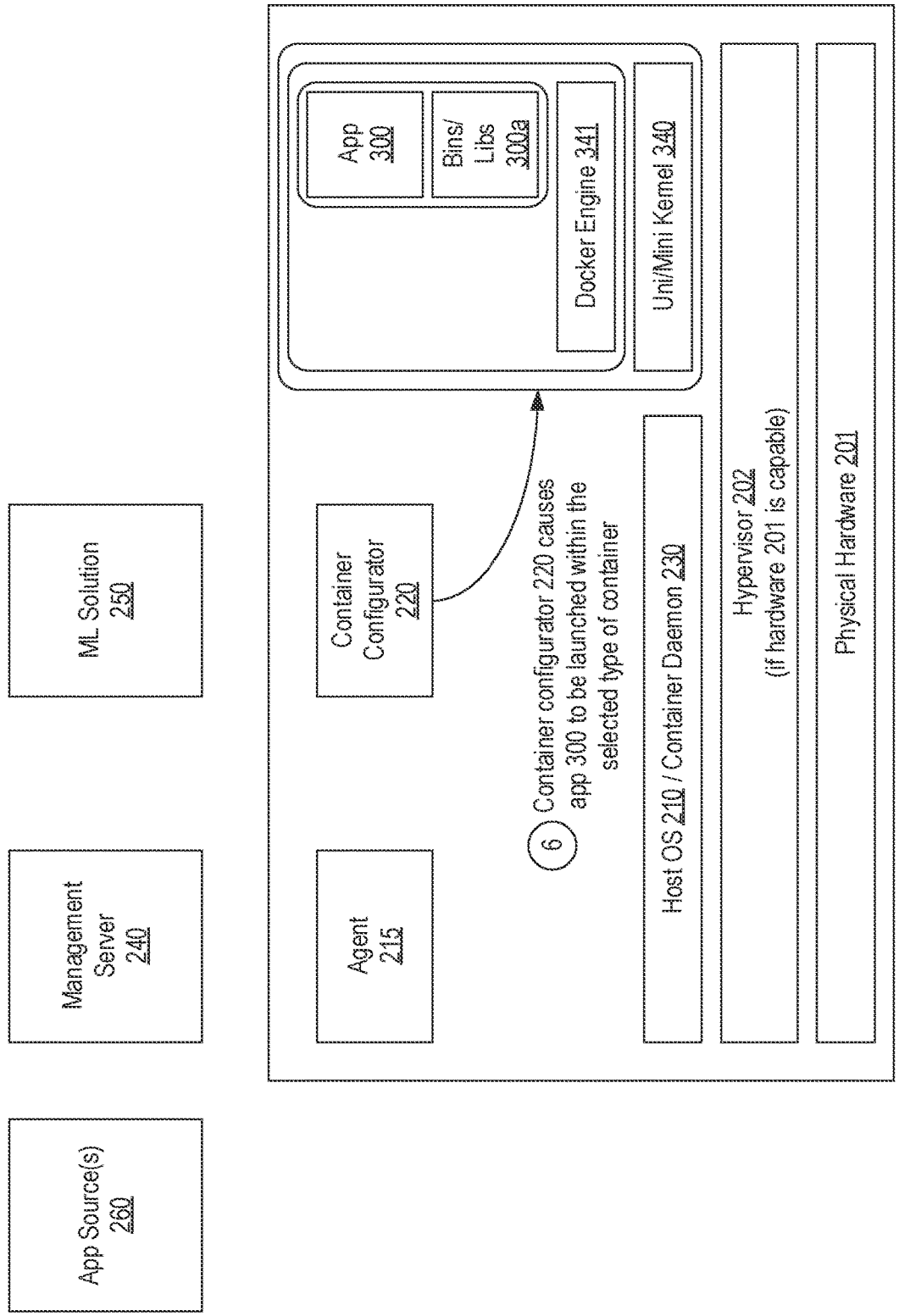

Turning to FIG. 3F, once container configurator 220 receives the selected container mode for application 300, in step 6, it can cause application 300 to be launched using the selected container mode. For example, FIG. 3F represents a scenario where the selected container mode is a virtual machine with a memory enclave (implemented using uni/mini kernel 340 running on hypervisor 202 and docker engine 341) in which application 300 and its binaries/libraries 300a are isolated.

Although not shown, this process represented in FIGS. 3D-3F could be performed when other applications are launched on end user computing device 200 resulting in each of the other applications being launched using the container mode dynamically selected for the particular application. As a result, different applications could be running simultaneously on end user computing device 200 in different container modes each of which is best suited for the particular application, the resource utilization and capabilities and the admin preferences. In short, embodiments of the present invention enable an employer or other organization to best utilize the wide variety of containerization solutions without sacrificing security or scalability.

Figure 6:
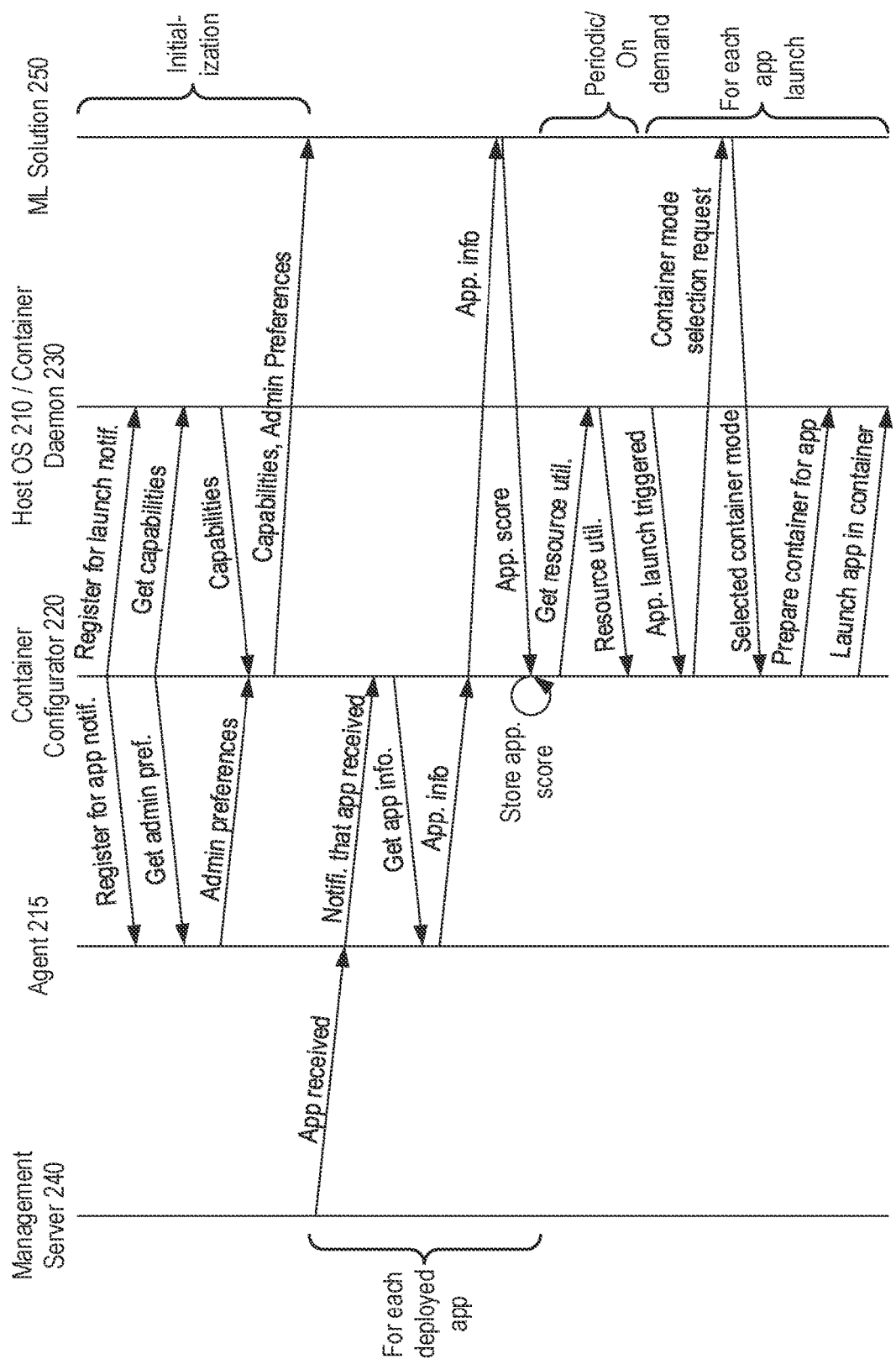
FIG. 6 provides a flowgraph representing how a container mode can be dynamically selected in accordance with one or more embodiments of the present invention.

FIG. 6 provides a flowgraph representing how the above-described functionality can be performed in one or more embodiments of the present invention. This flowgraph represents a number of steps that can be performed as part of an initialization phase to provide capabilities and admin preferences of an end user computing device to ML solution 250. Notably, the flowgraph represents an implementation where the capabilities and admin preferences may be provided to ML solution 250 prior to the submission of any container mode selection request. Accordingly, in such implementations, ML solution 250 can store the capabilities and admin preferences in association with an identifier of the respective end user computing device so that this information can be retrieved when container configurator 220 on the respective end user computing device submits a container mode selection request.

This flowgraph of FIG. 6 also includes a number of steps that are performed whenever an app is deployed to the respective end user computing device to generate and store an app score. The flowgraph also represents that container configurator 220 may periodically retrieve resource utilization. The flowgraph also includes a number of steps that are performed whenever an app is launched on the respective end user computing device to retrieve a dynamically selected container mode and to then prepare a container matching the selected container mode and launch the app within the container.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for dynamically selecting a container mode when launching an application on an end user computing device, the method comprising:
   detecting that a first application is being launched on an end user computing device;
   sending a container mode selection request to a server, the container mode selection request including an application score for the first application;
   receiving a selected container mode from the server in response to the container mode selection request;
   preparing a container on the end user computing device that matches the selected container mode; and
   causing the first application to be launched in the container.

2. The method of claim 1, further comprising, prior to detecting that the first application is being launched on the end user computing device:
   detecting that the first application has been deployed to the end user computing device;
   sending application information for the first application to the server; and
   receiving the application score for the first application that the server generated using the application information for the first application.

3. The method of claim 2, wherein the application score comprises one or more of:
   a trust rank;
   an identification of peripherals; or
   a runtime size.

4. The method of claim 2, wherein the application information for the first application includes one or more of:
   a name of the first application;
   an identification of whether the first application is signed;
   an identification of whether the first application has a trusted certificate;
   an image size of the first application; or
   dependencies of the first application.

5. The method of claim 1, wherein the container mode selection request also includes one or more of:
   capabilities of the end user computing device;
   resource utilization on the end user computing device; or
   admin preferences.

6. The method of claim 1, wherein the server dynamically determines the selected container mode from the application score for the first application, capabilities of the end user computing device, resource utilization on the end user computing device and admin preferences.

7. The method of claim 1, wherein the server dynamically determines the selected container mode from the application score for the first application and one or more of:
   capabilities of the end user computing device;
   resource utilization on the end user computing device; or
   admin preferences.

8. The method of claim 1, wherein the selected container mode is selected from multiple available container modes including:
   a container mode that uses mandatory access control mechanisms;
   a container mode that uses software isolation; and
   a container mode that uses hardware isolation.

9. The method of claim 1 wherein the selected container mode is selected from multiple available container modes including:
   a container mode that uses mandatory access control mechanisms;
   a container mode that uses software enclaves;
   a container mode that uses software virtualization;
   a container mode that uses a virtual machine; and
   a container mode that combines more than one of the previously recited container modes.

10. The method of claim 1, further comprising:
    detecting that a second application is being launched on the end user computing device;
    sending a second container mode selection request to the server, the second container mode selection request including an application score for the second application;
    receiving a second selected container mode from the server in response to the second container mode selection request;
    preparing a second container on the end user computing device that matches the second selected container mode; and
    causing the second application to be launched in the second container.

11. The method of claim 10, wherein the second selected container mode is different from the selected container mode.

12. The method of claim 1, wherein the server is a machine learning solution.

13. One or more computer storage media storing computer executable instructions which when executed implement a method for dynamically selecting a container mode when launching an application on an end user computing device, the method comprising:
    detecting that a first application is being launched on an end user computing device;
    sending a first container mode selection request to a server, the first container mode selection request including a first application score for the first application;
    receiving a first selected container mode from the server in response to the first container mode selection request;
    preparing a first container on the end user computing device that matches the first selected container mode;
    causing the first application to be launched in the first container;
    detecting that a second application is being launched on the end user computing device;
    sending a second container mode selection request to the server, the second container mode selection request including a second application score for the second application;

receiving a second selected container mode from the server in response to the second container mode selection request;

preparing a second container on the end user computing device that matches the second selected container mode; and causing the second application to be launched in the second container.

14. The computer storage media of claim 13, wherein the first and second selected container modes are different.

15. The computer storage media of claim 13, wherein the first and second container mode selection requests also include resource utilization on the end user computing device.

16. The computer storage media of claim 13, wherein the first and second selected container modes are selected based on capabilities of the end user computing device and admin preferences.

17. The computer storage media of claim 13, wherein the method further comprises:

generating the first application score in response to the first application being deployed to the end user computing device; and generating the second application score in response to the second application being deployed to the end user computing device.

18. The computer storage media of claim 13, wherein the method further comprises:

detecting that the first application is being launched a second time on the end user computing device;

sending an additional container mode selection request to the server in response to the first application being launched the second time, the additional container mode selection request including the first application score and resource utilization on the end user computing device;

receiving an additional selected container mode from the server in response to the additional container mode selection request, the additional selected container mode being different from the first selected container mode;

preparing a third container on the end user computing device that matches the additional selected container mode; and causing the first application to be launched the second time in the third container.

19. A method for dynamically selecting a container mode when launching an application on an end user computing device, the method comprising:

detecting, by a container configurator executing on an end user computing device, that an application has been deployed to the end user computing device;

sending, by the container configurator, application information for the application to a machine learning solution;

generating by the machine learning solution, an application score from the application information;

receiving, by the container configurator, the application score;

detecting, by the container configurator, that the application is being launched on the end user computing device;

sending, by the container configurator, a container mode selection request to the machine learning solution, the container mode selection request including the application score;

generating, by the machine learning solution, a selected container mode for launching the application based on the application score and one or more of capabilities of the end user computing device, resource utilization on the end user computing device or admin preferences;

receiving, by the container configurator, the selected container mode;

preparing, by the container configurator, a container on the end user computing device that matches the selected container mode; and causing, by the container configurator, the application to be launched in the container.

20. The method of claim 19, wherein the application score includes one or more of a trust score, peripherals or a runtime size.

* * * * *